United States Patent [19]

Schloman, Jr. et al.

[11] Patent Number: 4,621,118

[45] Date of Patent: Nov. 4, 1986

[54] SULFURIZED GUAYULE RESIN AND RUBBER

[75] Inventors: William W. Schloman, Jr., Stow; James A. Davis, Uniontown, both of Ohio

[73] Assignee: The Firestone Tire & Rubber Company, Akron, Ohio

[21] Appl. No.: 714,583

[22] Filed: Mar. 21, 1985

[51] Int. Cl.$^4$ .......................... C08L 7/00; C08L 75/04
[52] U.S. Cl. ................................. 525/130; 525/129; 525/199; 525/211; 525/215; 525/220; 525/227; 525/233; 525/236; 525/237; 525/354; 528/930
[58] Field of Search ............... 525/129, 130, 199, 211, 525/215, 220, 227, 232, 233, 236, 237

[56] References Cited

U.S. PATENT DOCUMENTS

| | | | |
|---|---|---|---|
| 1,349,909 | 8/1920 | Pratt | 524/609 |
| 2,346,702 | 4/1944 | Polin | 260/399 |
| 2,987,478 | 6/1961 | Matson | 252/46.4 |
| 3,021,300 | 2/1962 | Ardley | 524/525 |
| 4,542,191 | 9/1985 | Kay | 525/383 |

FOREIGN PATENT DOCUMENTS 0049175  4/1982  European Pat. Off. .

*Primary Examiner*—Christopher Henderson
*Attorney, Agent, or Firm*—Daniel N. Hall

[57] ABSTRACT

Guayule resin is sulfurized such that it has a high softening point of at least 70° C. The sulfurized guayule resin can be utilized in association with conventional rubbers and the end results in improved properties such as reduced hysteresis loss, increased tensile strength and the like.

10 Claims, No Drawings

SULFURIZED GUAYULE RESIN AND RUBBER

FIELD OF THE INVENTION

Guayule resins chemically treated with sulfur have high softening points and are used as additives to improve various physical properties of rubber.

PRIOR ART

U.S. Pat. No. 1,349,909 to Pratt relates to the use of sulfurized oil of turpentine in fiber surface coatings. It is not pertinent in that it fails to teach the use of a sulfurized guayule resin or the use thereof as an additive to improve properties of rubber compositions.

U.S. Pat. No. 2,346,702 to Polin and Nerkin relates to the use of sulfurized unsaturated oils as rubber substitutes for paint and lacquer additives. Accordingly it fails to suggest any sulfurized guayule reaction product.

U.S. Pat. No. 2,987,478 to Matson relates to the use of sulfurized fatty oils and lubricating oil compositions. Hence, it also fails to teach or suggest a sulfurized guayule resin.

SUMMARY OF THE INVENTION

It has been found that the addition of high amounts of sulfur to guayule resin produces a blend having a softening point of 70° C. or greater. When blended with rubber, the product activates the cure. Upon cure, the product has an unexpectedly low hysteresis loss.

In general a high softening point guayule resin, comprises the guayule resin chemically treated with sulfur, said sulfurized guayule resin having a softening point of at least 70° C. according to ASTM Test E28-67.

DETAILED DESCRIPTION OF INVENTION

Among the plant materials that can be used as sources of guayule resins and guayule-like resins are a large number of plant species bearing rubber and rubber-like hydrocarbons. These include particularly guayule itself, gopher plant (*Euphorbia lathyris*), mariola (*Parthenium incanum*), rabbitbrush (*Chrysothamnus nauseosus*), candelilla (*Pedilanthus macrocarpus*), Madagascar rubbervine (*Cryptostegia grandiflora*), milkweeds (*Asclepias syriaca, speciosa, subulata,* et al), goldenrods (*Solidago altissima, graminifolia, rigida,* et al), pale Indian plantain (*Cacalia atriplicifolia*), Russian dandelion (*Taraxacum kok-saghyz*), mountain mint (*Pycnanthemum incanum*), American germander (*Teucreum canadense*) and tall bellflower (*Campanula americana*). Many other plants which produce rubber and rubber-like hydrocarbons are known, particularly among the Compositae, Euphorbiaceae, Campanulaceae, Labiatae, and Moraceae families. Guayule resin or resinous rubber prepared from such plants are extracted with an organic polar solvent. Such polar solvents include alcohols having from 1 to 8 carbon atoms such methanol, ethanol, isopropanol, and the like; esters having from 3 to 8 carbon atoms such as the various formates, the various acetates, and the like; and ketones having from 3 to 8 carbon atoms, such as acetone, methyl ethyl ketone, and the like. The preferred extraction solvent is acetone or ethyl alcohol. The resin generally constitutes about 6 to 15 percent of the dry weight of the plant. The resin can be obtained by any conventional solvent extraction of the plant material such as the whole shrub, leaves or woody tissue, or combinations thereof. Generally a suitable crush or grinding step is utilized such as a hammermill. The organic polar solvent is then added to the crushed guayule plant material to extract the resin therefrom.

According to the present invention, a sulfurized quayule resin is obtained by chemically treating the resin with sulfur. By the term "sulfur," it is meant elemental sulfur or equivalent compounds thereof containing sulfur therein. Desirably, the guayule material is physically processed as by vacuum or steam devolatilization, extraction with a hydrocarbon such as hexane, or the like. Devolatilization removes low-boiling oils which often cause undesirable odors and excessive softening when present. Suitable hydrocarbons include an alkane having from 4 to 9 carbon atoms such as heptane and cycloalkanes having from 5 to 10 carbon atoms such as cyclohexane. The hydrocarbon extraction step allows separation of less-soluble polar compounds which are removed as an insoluble residue. Naturally, the hydrocarbon soluble portion of the resin is recovered for sulfur treatment. Combinations of these physical treatments may also be utilized.

The chemical reaction of the sulfur with the guayule resin is conducted at a temperature of from about 140° C. to about 200° C., desirably from about 150° C. to about 200° C. and preferably from about 150° C. to about 165° C. An amount of sulfur is added such that the final sulfur content of the sulfurized guayule is approximately 30% to about 90% by weight. Accordingly, based upon 100 parts by weight of guayule resin, from about 42 parts by weight to about 900 parts by weight of sulfur is added thereto. Inasmuch as from about 30% to about 50% by weight is preferred, the amount of sulfur added to 100 parts by weight of guayule resin is from about 42 parts by weight to about 100 parts by weight.

Various conventional additives or curatives, either alone or in combination and in conventional amounts can be added to promote the sulfurization reaction. Accordingly, metal oxides such as zinc oxide can be utilized. Another group are the fatty acids such as stearic or oleic acid. Various accelerators such as the sulfenamides, alkylthiuram disulfides, metal dithiocarbamate salts, 2-mercaptobenzothiazole and its metal salts, and the like can also be added. Additionally, amines such as morpholine can also be utilized.

The sulfurization treatment is generally carried on in a closed vessel in the presence of an inert gas such as nitrogen. The reaction mixture desirably is agitated by mechanical means or by the use of a nitrogen sparge. Another function of a sparge is to remove volatile by-products.

The sulfurized guayule resin product according to the present invention has a ring and ball softening point of at least 70° C. and desirably from about 70° C. to about 100° C. The softening point is determined utilizing all ASTM Method E28-67. Softening points below this temperature make handling difficult as well as yield undesirable physical properties. Thus, sulfur treatments utilizing low sulfur amounts, that is below the above set forth amounts does not fall within the scope of the present invention. Unexpectedly it has been found that high amounts of sulfur treatment result in a very high softening point, that is at least 70° C.

The sulfurized guayule resin of the present invention typically can be added and used in various rubber formulations to impart various favorable properties such as tack, cure activation, and to reduce the dynamic heat loss, that is the hysteresis loss. Generally any conventional type of rubber compound or formulation can be utilized as well known to the art. Examples of suitable types of rubber include natural rubber, rubber made from diene monomer having from 4 to 12 carbon atoms, including isoprene, butadiene, and the like; rubbers made from interpolymers of diene monomers have from 4 to 12 carbon atoms such as isoprene and butadiene, and the like; rubber copolymers made from diene monomers have from 4 to 12 carbon atoms with other copolymerizable monomers as for example, vinyl substituted aromatics having from 8 to 12 carbon atoms i.e. styrene, alpha-methylstyrene, or other monomers such as an acrylic ester, methyl isopropenyl ketone, isobutylene, acrylonitrile or an unsaturated carboxylic acid; halogenated rubber such as polychloroprene or chlorosulfonated polyethylene, fluororubbers; terpolymers of one or more monolefins with a monomer which confers unsaturation on the interpolymer, for example the various types of EPDM terpolymers, butyl rubbers, halobutyl rubbers, norbornene rubbers, polysulfide rubbers, sulfur vulcanizable polyurethane rubber, and blends thereof. Additionally, blends of the above rubbers containing a minor portion of SBS or SIS (styrene and butadiene or isoprene) copolymers can also be used. Additionally, one or more of the above synthetic rubbers can be blended with the various amounts of natural rubber as by example from about 10% to about 95% of natural rubber.

Various amounts of conventional or common rubber additives can be added to the rubber in conventional amounts as well known to the art or as set forth in the Vanderbilt Rubber Handbook, copyright 1978. Thus, various fillers and reinforcing agents such as carbon black or silica can be utilized. Additionally, various processing oils such as aromatic, paraffinic or naphthenic type can be utilized. Other common additives are the metal salts such as zinc oxide and the like. Fatty acids can also be utilized such as stearic acid. Other additives include accelerators such as the various sulfenamide, various antioxidants such as hindered phenols and substituted p-phenylenediamines.

In general, low amounts of sulfurized guayule resin, that is generally 2 parts or less per 100 parts of rubber impart increased building tack as well as reduced hysteresis loss. When high amounts of sulfurized guayule resin, that is 2 parts or greater per 100 parts of rubber are utilized, generally shorter scorch time, shorter cure times, higher tensile strength as well as higher cure rate indices are achieved.

The amount of sulfurized guayule resin utilize per 100 parts by weight of rubber is generally from about 0.1 to about 10.0 parts by weight, desirably from about 0.2 to about 5.0 parts by weight and preferably from about 0.5 to about 2.5 parts by weight. Accordingly, the amount of guayule resin will generally vary from rubber composition to rubber composition depending on the type of rubber utilized therein as well as the specific use of the rubber composition.

The cure of the rubber compounds containing the sulfurized guayule resin therein can be in accordance with any conventional method. The curing times and temperatures are conventional and will generally vary somewhat according to the type of rubber composition as well as the desired end use.

The sulfurized guayule resin of the present invention as noted, can be used as a tackifier for rubber compositions. Tack, or building tack, is a measure of the ability of two unvulcanized rubbers to stick together during fabrication prior to vulcanization. Good building tack is a desired property in handling of vulcanized materials. Accordingly, the sulfurized guayule resin of the present invention is desirably an additive to natural and synthetic rubbers to increase the green stock building tack or correct any deficiencies in tack properties.

Another property of the sulfurized guayule resin of the present invention is that it unexpectedly yields a large improvement in activating the cure of sulfur-vulcanized rubber compositions. Cure activation is effected by reducing the time to the onset of vulcanization, the scorch time ($t_s2$) or the time to optimum cure, that is the cure time ($t'_c90$), or both. The cure activation is commonly measured by the cure rate index which is defined as the number 100 divided by the quantity $t'_c90$ minus $t_s2$. Thus, the sulfurized guayule resin is desirably added to natural and synthetic rubber compositions to activate cure, decrease scorch time, and to increase the cure rate index. The sulfurized guayule resin has also been found to generally increase the tensile strength of vulcanized rubber compositions.

An important property of a sulfurized guayule resin of the present invention is that it dramatically reduces the dynamic heat loss, that is the hysteresis loss, in vulcanized rubber compositions. Hysteresis loss is defined as the ratio of the loss modulus to the storage modulus of a rubber composition and is a measure of the energy dissipated during deformation or flexing in tires such as passenger and truck tires. Decreased hysteresis loss in the rubber compositions also contributes to abating rolling resistance. The amount of hysteresis loss as apparent from the examples set forth hereinbelow was truly unexpected and even synergistic in comparison with the control in that a significant reduction was obtained.

Accordingly, the sulfurized guayule resin of the present invention can be utilized wherever the above properties are desired such as in tires, including passenger tires, truck tires and off-the-road tires, hoses, conveyor belts, power and transmission belts, fuel or chemical tank linings, thermal insulation, flotation gear, automotive floor mats, mud flaps, rubber tiles, motor mounts, draft gear pads, gaskets, seals, O-rings, bumpers, roofing membranes, tank track pads, shock absorbers, and other mechanical rubber goods.

The preparation of the sulfurized resin products of the present invention is set forth in the following examples. Additionally, the use of such guayule resin as an additive is shown with a typical rubber compounding recipe as set forth in Table II. Naturally, many other conventional or commercial recipes can also be utilized. As a control or comparative example, a commercial vulcanized fatty oil sold by the Keil Chemical Division of Ferro Corporation under the name "Sul-Perm 12" was utilized. This oil had a sulfur content of about 12% by weight. Table I sets forth the softening point of sulfurized guayule resin containing different sulfur contents therein. As apparent from Table I, Examples 1 and 2 which have less than 30 percent by weight of sulfur therein had a low softening point that is lower than 70° C.

In the recipe of Table II, the level of sulfur was maintained at one part per 100 parts of rubber by weight and the levels of a sulfurized guayule resin products, as well as the vulcanized fatty oil, were adjusted to provide an additional sulfur content as specified in Table III.

The building tack properties, the cure characteristics, the tensile strength, and the hysteresis properties were determined in the following manner:

The building tack properties of the unvulcanized compounded stocks were determined using nylon fabric-reinforced plaques on an Instron Model TTD tester. Test pieces were pressed 15 minutes at 93° C. before measurement. Table III illustrates the improvements in building tack obtained with the products of Examples 4 and 5.

Cure characteristics of the compounded stocks were determined by means of a Monsanto Oscillating Disc Curemeter (ASTM Method D2084-81). The cure data summarized in Table IV show that the high-sulfur resin products of Examples 4 through 7 decreased both the scorch time and cure time. The products of Examples 4 through 7 also increased the cure rate index. This behavior, typical of cure activators, was not obtained with the vulcanized fatty oil.

Tensile properties of the cured compounded stocks were determined in accordance with ASTM Method D412-80, Method B. Data summarized in Table V show that the products of Examples 4 through 5 increase compound tensile strength.

Dynamic properties of the cured compounded stocks were evaluated in two ways: resilience and hysteresis loss factor. Resilience was measured as steel ball vertical rebound at 23° C. in accordance with ASTM Method D2632-79. Table VI illustrates that the vulcanized fatty oil imparts inferior compound resilience. Hysteresis loss factors were determined at 23° C. using the well-known MTS Model 830 elastomer test system. Table VI illustrates that only the high-sulfur resin products of Examples 4 through 7 decrease hysteresis loss.

The invention will be better understood by reference to the following examples.

The following examples are representative. The composition component parts are expressed in parts per 100, phr, unless otherwise specified. The ratios and percentages are by weight unless specifically indicated.

EXAMPLE 1

In a reactor equipped with a mechanical stirrer, 136 parts of the hexane-soluble fraction of guayule resin was heated to 140° C. To the heated resin fraction was added 14.5 parts of sulfur. The temperature of the mixture was raised to 155°–160° C. and maintained at this level for 90 minutes. During this time, a nitrogen stream was passed through the mixture by means of a sparge tube so as to facilitate the distillation of volatile by-products. In this manner were obtained 143 parts of a resinous product.

EXAMPLE 2

Following the procedure in Example 1, 150 parts of the hexane-soluble fraction of guayule resin and 50 parts of sulfur were reacted to afford 191 parts of a resinous product.

EXAMPLE 3

Following the procedure in Example 1, 120 parts of the hexane-soluble fraction of guayule resin and 60 parts of sulfur were reacted to afford 169 parts of a resinous product.

EXAMPLE 4

Following the procedure in Example 1, 110 parts of guayule resin and 55 parts of sulfur were reacted to afford 154 parts of a resinous product.

EXAMPLE 5

Following the procedure in Example 1, 110 parts of guayule resin was heated to 140° C. To the heated resin was added 55 parts of sulfur and 2.5 parts of tetramethylthiuram disulfide. Reaction was carried out at 155°–160° C. to afford 154 parts of a resinous product.

EXAMPLE 6

Following the procedure in Example 5, 110 parts of guayule resin, 55 parts of sulfur, and 4.1 parts of zinc 2-mercaptobenzothiazole were reacted to afford 159 parts of a resinous product.

EXAMPLE 7

Following the procedure in Example 1, 110 parts of guayule resin and 90 parts of sulfur were reacted to afford 190 parts of a resinous product.

Accordingly, it can be seen, as previously noted above, that the sulfurized guayule resin imparts favorable properties not only to the guayule resin, but also to rubber elastomers utilized in association therewith.

TABLE I

SULFURIZED GUAYULE RESIN PHYSICAL PROPERTIES

| Resin Example No. | Total Sulfur Content, % | sp, °C. |
|---|---|---|
| 1 | 11 | 56 |
| 2 | 26 | 67 |
| 3 | 31 | 74 |
| 4 | 33 | 77 |
| 5 | 33 | 85 |
| 6 | 32 | 74 |
| 7 | 47 | 91 |

TABLE II

RUBBER TEST RECIPE

| Ingredients | Parts by Weight |
|---|---|
| 1. NR | 50 |
| 2. SBR | 50 |
| 3. HAF Carbon black | 50 |
| 4. Medium aromatic process oil | 3 |
| 5. Zinc oxide | 3 |
| 6. Stearic acid | 2 |
| 7. Antioxidant (substituted p-phenylenediamine | 1 |
| 8. Sulfenamide accelerator | 1 |
| 9. Sulfur | 1 |
| 10. Sulfurized guayule resin | Variable |

TABLE III

TACKIFYING PROPERTIES DATA

| Resin Example No. | Sulfurized Resin, phr | Resin Sulfur Content, phr | Building Tack, KN/m |
|---|---|---|---|
| Control | 0 | 0 | 3.4 |
| Vulcanized fatty oil | 2.5 | 0.3 | 3.2 |
| 4 | 0.5 | 0.2 | 3.4 |
| 4 | 0.8 | 0.3 | 3.5 |
| 4 | 1.4 | 0.7 | 2.7 |
| 4 | 2.0 | 0.8 | 2.5 |
| 5 | 0.8 | 0.3 | 3.7 |
| 6 | 0.8 | 0.3 | 3.3 |
| 7 | 0.6 | 0.3 | 3.4 |

TABLE IV

| | CURE DATA, 150° C. | | | | |
|---|---|---|---|---|---|
| Resin Example No. | Sulfurized Resin, phr | $t_s 2$, min | $t_c'90$, min | CRI | $M_{HR}$, dN·m |
| Control | 0 | 11.2 | 21.2 | 10.1 | 37.4 |
| Vulcanized fatty oil | 2.5 | 10.7 | 25.0 | 7.0 | 37.0 |
| 4 | 0.5 | 10.2 | 19.2 | 11.1 | 37.0 |
| 4 | 0.8 | 9.2 | 18.2 | 11.1 | 39.4 |
| 4 | 1.4 | 8.8 | 17.5 | 11.5 | 38.2 |
| 4 | 2.0 | 8.3 | 16.4 | 12.3 | 39.3 |
| 5 | 0.8 | 9.5 | 18.5 | 11.1 | 39.3 |
| 6 | 0.8 | 9.0 | 17.7 | 11.5 | 39.3 |
| 7 | 0.6 | 9.8 | 19.3 | 10.5 | 37.3 |

TABLE V

| | TENSILE PROPERTIES DATA* | |
|---|---|---|
| Resin Example No. | Sulfurized Resin, phr | Tensile Strength, MPa |
| Control | 0 | 18.6 |
| Vulcanized fatty oil | 2.5 | 20.5 |
| 4 | 0.5 | 14.6 |
| 4 | 0.8 | 17.8 |
| 4 | 2.0 | 21.0 |
| 5 | 0.8 | 19.1 |
| 6 | 0.8 | 18.6 |
| 7 | 0.6 | 17.1 |

*Stocks cured 23 min. at 150° C.

TABLE VI

| | DYNAMIC PROPERTIES DATA* | | |
|---|---|---|---|
| Resin Example No. | Sulfurized Resin, phr | Resilience, % | Hysteresis Loss Factor |
| Control | 0 | 46 | 0.214 |
| Vulcanized fatty oil | 2.5 | 43 | 0.216 |
| 4 | 0.5 | 50 | 0.202 |
| 4 | 0.8 | 48 | 0.200 |
| 4 | 2.0 | 49 | 0.193 |
| 5 | 0.8 | 47 | 0.199 |
| 6 | 0.8 | 46 | 0.197 |
| 7 | 0.6 | 49 | 0.193 |

*Stocks cured 30 min. at 150° C.

While in accordance with the patent statutes a best mode and preferred embodiment has been set forth, it is to be understood that numerous variations, combinations and permutations can be made within the scope of the present invention and accordingly the invention is set forth by the scope of the attached claims.

What is claimed is:

1. A rubber composition comprising;
a blend of a rubber and a sulfurized guayule resin having a high softening point, said guayule resin chemically treated with sulfur at a temperature of from 150° C. to about 200° C., the amount of said sulfur being from about 42 parts to about 900 parts by weight per 100 parts by weight of said guayule resin, said sulfurized guayule resin having a softening point of at least 70° C. according to ASTM Test E28-67, the amount of said sulfurized guayule resin being an effective amount to impart reduced hysteresis loss.

2. A rubber composition according to claim 1, wherein the amount of said sulfurized guayule resin is from about 0.1 to about 10.0 parts by weight per 100 parts by weight of said rubber.

3. A rubber composition according to claim 2, wherein said sulfurized guayule resin has a softening point of from about 70° C. to about 100° C.

4. A rubber composition according to claim 3, wherein the amount of sulfur added to said guayule resin is from about 42 parts to about 100 parts by weight per 100 parts by weight of said guayule resin, and wherein the amount of said sulfurized guayule resin is from about 0.2 to about 5.0 parts by weight per 100 parts by weight of said rubber.

5. A rubber composition according to claim 4, wherein said rubber is contained in a tire, or a mechanical rubber good.

6. A rubber composition according to claim 1, wherein said guayule resin contains from about 30% to about 90% by weight of sulfur therein.

7. A rubber composition according to claim 6, wherein the softening point of said guayule resin composition is from about 70° c. to about 100° C. and wherein the rubber is selected from the group consisting of natural polyisoprene, rubber made from diene monomers having from 4 to 12 carbon atoms, rubber made from interpolymers of diene monomers having from 4 to 12 carbon atoms, rubber copolymers made from diene monomers having from 4 to 12 carbon atoms and vinyl substituted aromatic monomers having from 8 to 12 carbon atoms; copolymers made from diene monomers having from 4 to 12 carbon atoms and a monomer selected from the group consisting of an acrylic ester, methyl isopropenyl ketone, acrylonitrile, or a monomer which confers unsaturation on the copolymer, sulfur vulcanizable polyurethane rubbers, butyl rubber, halobutyl rubbers, chlorosulfonated polyethylene, chloroprene rubber, fluororubbers, EPDM terpolymers, norbornene rubbers, and combinations thereof.

8. A rubber composition according to claim 7, wherein the amount of sulfur contained in said guayule resin is from about 30% to about 50% by weight.

9. A rubber composition according to claim 8, wherein the amount of said sulfurized guayule resin is from about 0.2 parts to about 5 parts by weight per 100 parts by weight of said rubber composition.

10. A rubber composition according to claim 9, wherein said rubber composition is contained in a tire, or a mechanical rubber good.

* * * * *